US012253735B2

(12) United States Patent
Maruo et al.

(10) Patent No.: US 12,253,735 B2
(45) Date of Patent: Mar. 18, 2025

(54) OPTICAL CABLE LAYING METHOD

(71) Applicant: NIPPON TELEGRAPH AND TELEPHONE CORPORATION, Tokyo (JP)

(72) Inventors: Yuta Maruo, Musashino (JP); Hiroaki Tanioka, Musashino (JP); Hisashi Izumita, Musashino (JP); Shigekatsu Tetsutani, Musashino (JP); Yusuke Yamada, Musashino (JP); Akira Sakurai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 213 days.

(21) Appl. No.: 17/926,672

(22) PCT Filed: Jun. 3, 2020

(86) PCT No.: PCT/JP2020/021890
§ 371 (c)(1),
(2) Date: Nov. 21, 2022

(87) PCT Pub. No.: WO2021/245828
PCT Pub. Date: Dec. 9, 2021

(65) Prior Publication Data
US 2023/0204896 A1 Jun. 29, 2023

(51) Int. Cl.
*G02B 6/46* (2006.01)
*G02B 6/44* (2006.01)

(52) U.S. Cl.
CPC .............. *G02B 6/46* (2013.01); *G02B 6/4439* (2013.01)

(58) Field of Classification Search
None
See application file for complete search history.

(56) References Cited

U.S. PATENT DOCUMENTS 5,777,266 A * 7/1998 Herman .................. H02G 9/04
138/155
6,202,565 B1 * 3/2001 Henry .................. H02G 9/025
104/275

(Continued)

FOREIGN PATENT DOCUMENTS

CN 102565978 A 7/2012
JP H11-231187 A 8/1999

(Continued)

OTHER PUBLICATIONS

Riley Freeland et al., "Strain Sensing of an In-Road FTTH Field Trial and Implications for Network Reliability", Proc. of IWCS (2019).

*Primary Examiner* — Jerry Rahll
(74) *Attorney, Agent, or Firm* — Harness, Dickey & Pierce, P.L.C.

(57) ABSTRACT

An object of the present disclosure is to provide a method of laying an optical cable that is capable of laying and removing the optical cable in a stable place without civil engineering works. To achieve the above-mentioned object, a method of laying an optical cable according to the present disclosure includes laying the optical cable and two laying strips on a road surface or a wall surface so that the optical cable is sandwiched between side surfaces of the two laying strips.

4 Claims, 14 Drawing Sheets

(56) References Cited

U.S. PATENT DOCUMENTS

| | | | | |
|---|---|---|---|---|
| 7,394,025 | B1 * | 7/2008 | Wong | H02G 3/305 |
| | | | | 104/275 |
| 8,842,960 | B2 * | 9/2014 | Berglund | G02B 6/4459 |
| | | | | 385/136 |
| 2009/0294016 | A1 * | 12/2009 | Sayres | B29C 48/09 |
| | | | | 156/196 |
| 2017/0207612 | A1 * | 7/2017 | Handler | H02G 9/025 |

FOREIGN PATENT DOCUMENTS

| | | |
|---|---|---|
| JP | 2009-288382 A | 12/2009 |
| JP | 2017-198900 A | 11/2017 |

* cited by examiner

[11]

[14]

OPTICAL CABLE LAYING METHOD

CROSS-REFERENCE TO RELATED APPLICATIONS

This application is a 371 U.S. National Phase of International Application No. PCT/JP2020/021890, filed on Jun. 3, 2020. The entire disclosure of the above application is incorporated herein by reference.

TECHNICAL FIELD

The present disclosure relates to a method of laying an optical cable.

BACKGROUND ART

Optical cables are used as transmission media for information communications. When the optical cables are laid outdoors, for example, an overhead wiring technology or an underground wiring technology is used. The overhead wiring technology is a wiring technology in which utility poles are built in advance on the ground and the optical cables are installed on the utility poles. The underground wiring technology is a wiring technology in which pipelines are buried underground in advance and the optical cables are laid in the pipelines.

Up to now, for lying new optical cables, the optical cables have been additionally laid in the area where metallic cables for communication have been already laid in most cases. In these cases, since fundamental equipment such as utility poles and pipelines has already been built, the optical cables can be economically laid without new civil engineering works. The reason is that the location where communication demand arises is similar to the location where the existing metallic cables have been wired, and thus the optical cables can be additionally laid without constructing new fundamental equipment.

To widely deploy, for example, antennas for mobile phones, the demand to lay optical fibers has recently arisen even in areas where fundamental equipment has not been built. Even when fundamental equipment has been built, the demand to provide new wiring arises on structures such as road lamps on roads instead of houses and buildings. These demands involve large investment to build additional fundamental equipment. For economical wiring of the optical cables, it is desirable to lay the optical cables without civil engineering works as much as possible.

To simplify civil engineering works, an optical cable that can be directly buried without using a pipeline has been proposed (see Patent Literature 1, for example). Alternatively, a method of laying an optical cable has also been proposed in which a groove is provided in a paved road surface and the optical cable is laid in the groove (see Non-Patent Literature 1, for example).

CITATION LIST

Patent Literature

Patent Literature 1: Japanese Patent Laid-Open No. 2017-198900

Non-Patent Literature

Non-Patent Literature 1: Strain Sensing of an In-Road FTTH Field Trial and Implications for Network Reliability, Proc. of IWCS (2019)

SUMMARY OF THE INVENTION

Technical Problem

Unfortunately, although eliminating the need for burying pipelines or building utility poles, these methods involve digging up the ground for a length long enough to lay the optical cables or excavating the road surfaces paved with asphalt or concrete. Such civil engineering works are difficult to be performed by human power, and are large-scale ones such that heavy machinery is used.

When the optical cables are wired, connection units need to be provided for extending or branching the optical cables. Such connection units are generally accommodated in housings such as closures. When optical cables are laid according to the above-mentioned prior art, certain spaces for housing these closures need to be secured. Furthermore, when the optical cables are pulled up from the underground to the ground, spaces for protecting pull-up ports are required. These spaces must be prepared before the optical cables are laid.

The optical cables to be laid later need to have extra-length portions for future connection and branching. To protect the extra-length portions of the optical cables, boxes for accommodating the extra-length portions need to be provided. Since being installed on the ground, the box may be an obstructive factor for road traffic.

To ensure stable communication, the optical cables need to be laid in stable places. Furthermore, when being no longer needed, the optical cables are desirably removed without civil engineering works, as in installation.

The present disclosure is intended to solve the above-mentioned problems, and it is an object of the present disclosure to provide a method of laying an optical cable that is capable of laying and removing the optical cable in a stable place without civil engineering works. It is another object of the present disclosure to provide a laying strip that enables an optical cable to be laid and removed in a stable place without civil engineering works.

Means for Solving the Problem

To achieve the above-mentioned object, a method of laying an optical cable according to the present disclosure includes embedding the optical cable in at least two laying strips that are laid so that their side surfaces are in contact with a road surface or a wall surface.

Specifically, a method of laying an optical cable according to the present disclosure includes laying the optical cable and two laying strips on a road surface or a wall surface so that the optical cable is sandwiched between side surfaces of the two laying strips.

The method of laying the optical cable according to the present disclosure includes taking a preventive measure to prevent a distance between the side surfaces of the two laying strips facing each other from being enlarged.

For example, taking the preventive measure may be, with the side surfaces of the two laying strips between which the optical cable is sandwiched facing each other, engaging respective concave-convex shaped portions, apart from potions in contact with the optical cable, included in the side surfaces of the two laying strips.

For example, taking the preventive measure may be, with the side surfaces of the two laying strips between which the optical cable is sandwiched facing each other, thrusting tips of staples across the side surfaces of the two laying strips.

The method of laying the optical cable according to the present disclosure may contain the following:
in laying the laying strips,
a part of the laying strips is cut out to form a space for accommodating a connection unit of the optical cable, and
a tray, in which the connection unit is to be arranged, is provided at a bottom of the space, and,
in laying the optical cable,
the optical cable is introduced into the tray and the connection unit is formed, and
the connection unit is accommodated in the tray, and an open side of the space is then covered with a lid.

The method of laying the optical cable according to the present disclosure may contain the following:
a space for accommodating a connection unit of the optical cable is formed in advance in the laying strips,
in laying the laying strips,
a tray, in which the connection unit is to be arranged, is provided at a bottom of the space, and,
in laying the optical cable,
the optical cable is introduced into the tray and the connection unit is formed, and
the connection unit is accommodated in the tray, and an open side of the space is then covered with a lid.

The method of laying the optical cable according to the present disclosure may include the following:
the laying strips have a perforated line to form a space for accommodating a connection unit of the optical cable,
in laying the laying strips,
the laying strips are cut using the perforated line to form the space, in which the connection unit is to be installed, and a tray, in which the connection unit is to be arranged, is then provided at a bottom of the space, and,
in laying the optical cable,
the optical cable is introduced into the tray and the connection unit is formed, and
the connection unit is accommodated in the tray, and an open side of the space is then covered with a lid.

A laying strip according to the present disclosure may include: a base layer unit having a side surface that is a plane; and a surface layer unit forming either a front side or a back side, with the base layer unit forming the other, and having a concave-convex shaped side surface on the same side as the side surface, the concave-convex shaped side surface having a concave portion and a convex portion whose shape is same as a shape plane-symmetrical to a shape of the concave portion with respect to a surface including the plane.

The above-mentioned inventions can be utilized in every combination possible.

Effects of the Invention

According to the method of laying the optical cable of the present disclosure, it is possible to lay and remove the optical cable in a stable place without civil engineering works. According to the laying strip of the present disclosure, it is possible to lay and remove the optical cable in a stable place without civil engineering works.

DESCRIPTION OF EMBODIMENTS

Figure 1:
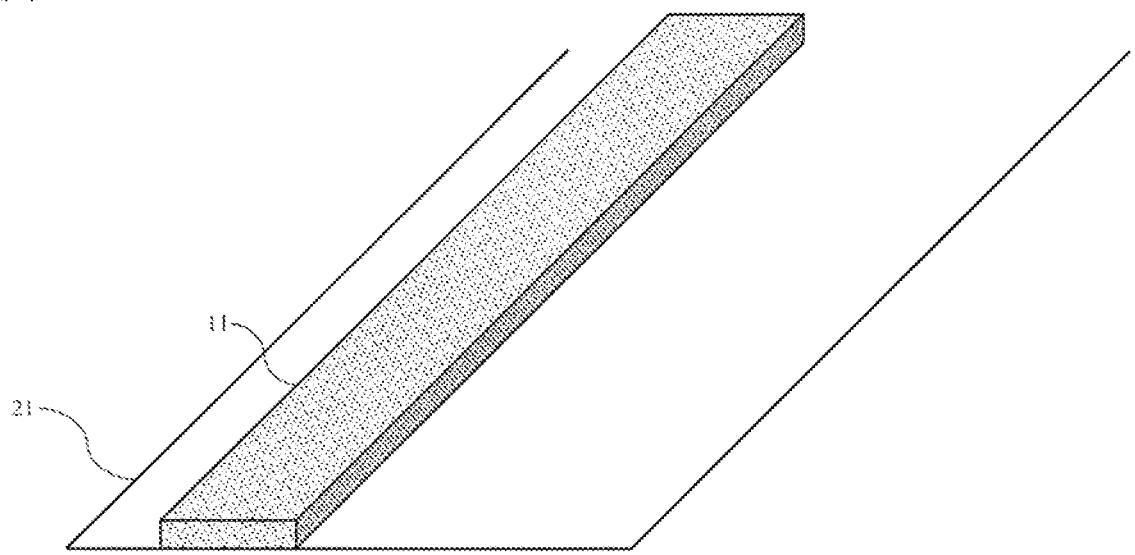
FIG. 1 illustrates a method of laying an optical cable.

Hereinafter, embodiments of the present disclosure will be described in detail with reference to the accompanying drawings. The present disclosure is not limited to the following embodiments. The embodiments are merely examples, and the present disclosure can be implemented in various forms obtained by altering or modifying the embodiments based on the knowledge of those skilled in the art. Components denoted by the same reference numerals in the present specification and the drawings mutually denote the same components.

First Embodiment

An example of a method of laying an optical cable according to the present disclosure will be described with reference to FIGS. 1 to 4. In FIGS. 1 to 4, the reference numerals 11 and 12 denote laying strips, the reference numeral 21 denotes a road surface, and the reference numeral 22 denotes an optical cable.

FIG. 1 illustrates a laying strip 11 laid on a road surface 21. The laying strip 11 is preferably composed of an elastic material such as rubber and resin so that it may smoothly adapt to unevenness of the road surface 21 and absorb vibration from the road surface 21. When the laying strip 11 is long, roll thereof facilitates transportation to a laying site. When the laying strip 11 is divided into short and tile-like segments, the segments may be stacked for transportation. When the laying strip 11 is laid on the road surface 21, fixing the laying strip 11 to the road surface 21 with an adhesive stabilizes the laying strip 11. In the present embodiment, a surface having a smaller area of four longitudinal surfaces of each of the laying strip 11 and a laying strip 12 described later is referred to as a side surface. Alternatively, a surface to which an optical cable 22 is to be conformed is referred to as a side surface. In regard to surfaces having a larger area of respective four longitudinal surfaces of the laying strip 11 and the laying strip 12 described later, a surface that is to be in contact with the road surface 21 is referred to as a bottom surface, and a surface facing the bottom surface is referred to as a top surface.

Figure 2:
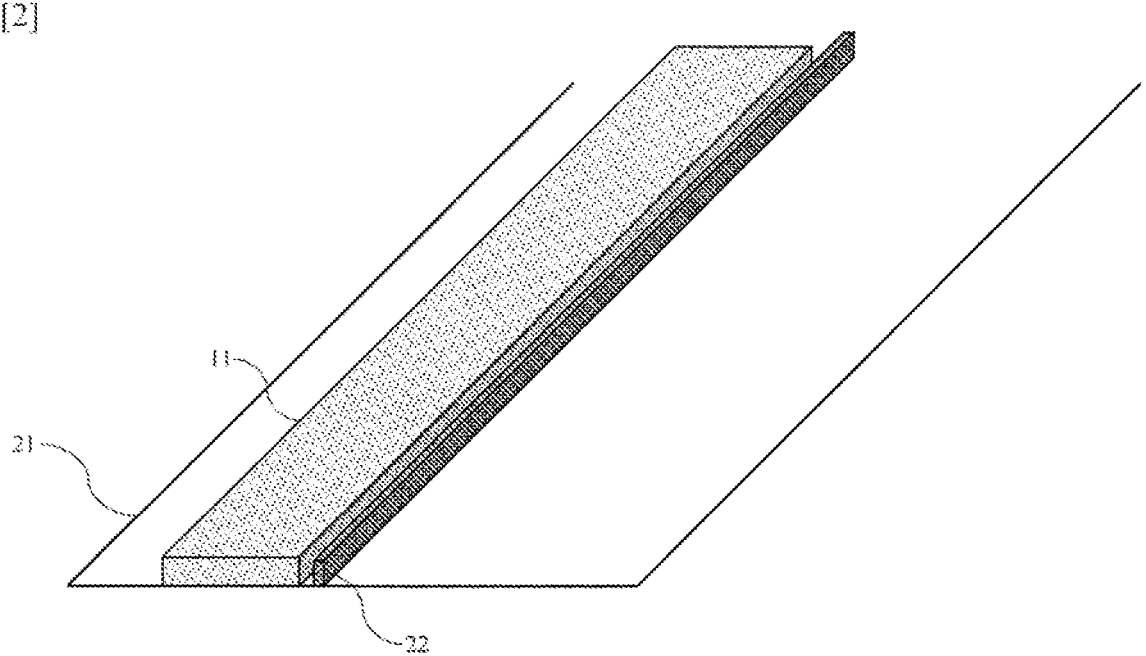
FIG. 2 illustrates the method of laying the optical cable.

FIG. 2 illustrates an optical cable 22 laid to conform to one side surface of a laying strip 11. When the optical cable 22 cannot conform to the side surface of the laying strip 11 only by laying the optical cable 22 adjacent to the laying strip 11, the optical cable 22 may be temporally tacked to the side surface of the laying strip 11 with an easily removable pin, a tape, an adhesive or the like to keep the optical cable 22 conforming to the side surface of the laying strip 11.

Figure 3:
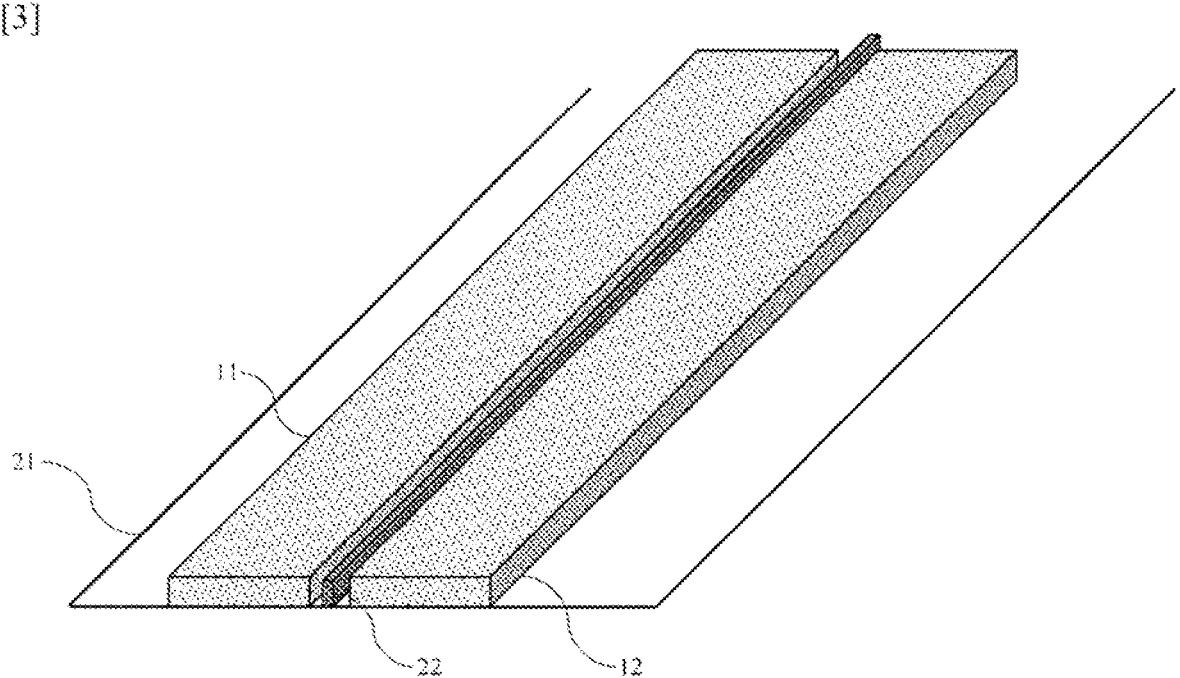
FIG. 3 illustrates the method of laying the optical cable.

FIG. 3 illustrates a laying strip 12 that is laid to conform to the laying strip 11 and the optical cable 22 that have been laid. The laying strip 12 is preferably composed of an elastic material such as rubber and/or resin so that it may smoothly adapt to unevenness of a road surface 21 and absorb vibration from the road surface 21. When the laying strip 12 is long, roll thereof facilitates transportation to a laying site. When the laying strip 12 is divided into short and tile-like segments, the segments may be stacked for transportation. When the laying strip 12 is laid on the road surface 21, fixing the laying strip 12 to the road surface 21 with an adhesive stabilizes the laying strip 12.

The laying strip 12 has a side surface parallel to the side surface of the laying strip 11 to which the optical cable 22 conforms. The laying strip 12 is laid with the side surface of the laying strip 11 and the side surface of the laying strip 12 being parallel so that the optical cable 22 is sandwiched between the side surfaces.

Figure 4:
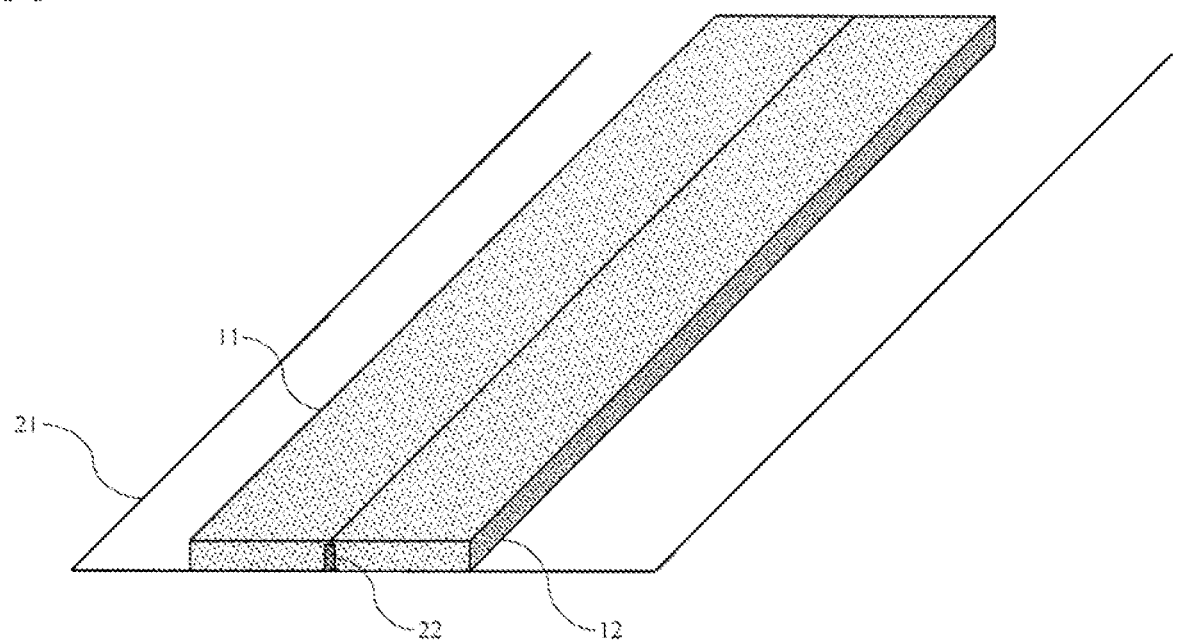
FIG. 4 illustrates the method of laying the optical cable.

FIG. 4 illustrates a situation in which the optical cable 22 is sandwiched between the side surface of the laying strip 11 and the side surface of the laying strip 12. The laying strips 11 and 12 are preferably composed of an elastic material so that the potion for sandwiching is filled after the optical cable 22 is sandwiched therebetween.

When there are no obstacles in the place where the optical cable 22 is to be laid, the side surface of the laying strip 11 and the side surface of the laying strip 12 between which the optical cable 22 is to be sandwiched each may be a plane and the optical cable 22 may be sandwiched in a straight manner. On the other hand, when there are some obstacles that prevent the optical cable 22 from being laid in a straight manner, the side surface of the laying strip 11 and the side surface of the laying strip 12 between which the optical cable 22 is to be sandwiched each may be a curved surface bent in the longitudinal direction and the optical cable 22 may be sandwiched in a curved manner to avoid the obstacles. Not only for the laying on the road surface 21, the same applies to the laying of the laying strip 11 and the laying strip 12 on a wall surface (not illustrated).

In the description for FIGS. 1 to 4, the laying strip 11 is laid on the road surface 21 or the wall surface, the optical cable 22 is laid, the laying strip 12 is laid, and then the optical cable 22 is sandwiched. However, after the laying strips 11 and 12 are laid, the optical cable 22 may be laid. Alternatively, after the optical cable 22 is laid, the laying strips 11 and 12 may be laid simultaneously or one by one on the road surface 21 or the wall surface so that the optical cable 22 is sandwiched between the laying strips. Furthermore, the laying strips 11 and 12 and the optical cable 22 may be laid together on the road surface 21 or the wall surface after sandwiching the optical cable 22 between the laying strips 11 and 12 in advance.

Three or more laying strips may be laid. The additional laying of the third laying strip allows an optical cable to be additionally laid.

When the optical cable 22 is removed, the laying strips 11 and 12 may be torn off from the road surface 21 or the wall surface (not illustrated). The laying strips 11 and 12 may be torn off after the optical cable 22 is removed, or the laying strips 11 and 12 may be torn off with the optical cable 22 sandwiched therebetween.

According to the method of laying the optical cable of the present embodiment, it is possible to provide a method of laying an optical cable that is capable of laying and removing the optical cable in a stable place without civil engineering works.

Second Embodiment

An example of a method of laying an optical cable according to the present disclosure will be described with reference to FIGS. 5 to 9. In FIGS. 5 to 9, the reference numerals 11 and 12 each denote a laying strip, the reference numeral 21 denotes a road surface, the reference numeral 22 denotes an optical cable, the reference numeral 31 denotes a base layer unit, the reference numeral 32 denotes a surface layer unit, and the reference numeral 33 denotes a staple.

The laying strips 11 and 12 are typically fixed to the road surface 21 or the wall surface with an adhesive or the like so that their side surfaces are in contact with each other. However, in the scheme for sandwiching the optical cable 22, the side surfaces could conceivably separate from each other, which results in exposing the sandwiched optical cable 22. Therefore, for the laying strips 11 and 12 of the present embodiment, a preventive measure is taken to the laying strips 11 and 12 of the first embodiment to prevent a distance between the side surfaces of the laying strips 11 and 12 facing each other from being enlarged.

Hereinafter, two exemplary preventive measures are given, but the present invention is not limited to them. As a first example, taking the preventive measure may be, with the side surfaces of the laying strips 11 and 12 between which the optical cable 22 is sandwiched facing each other, engaging respective concave-convex shaped portions, apart from potions in contact with the optical cable 22, included in the facing side surfaces of the laying strips 11 and 12.

Figure 5:
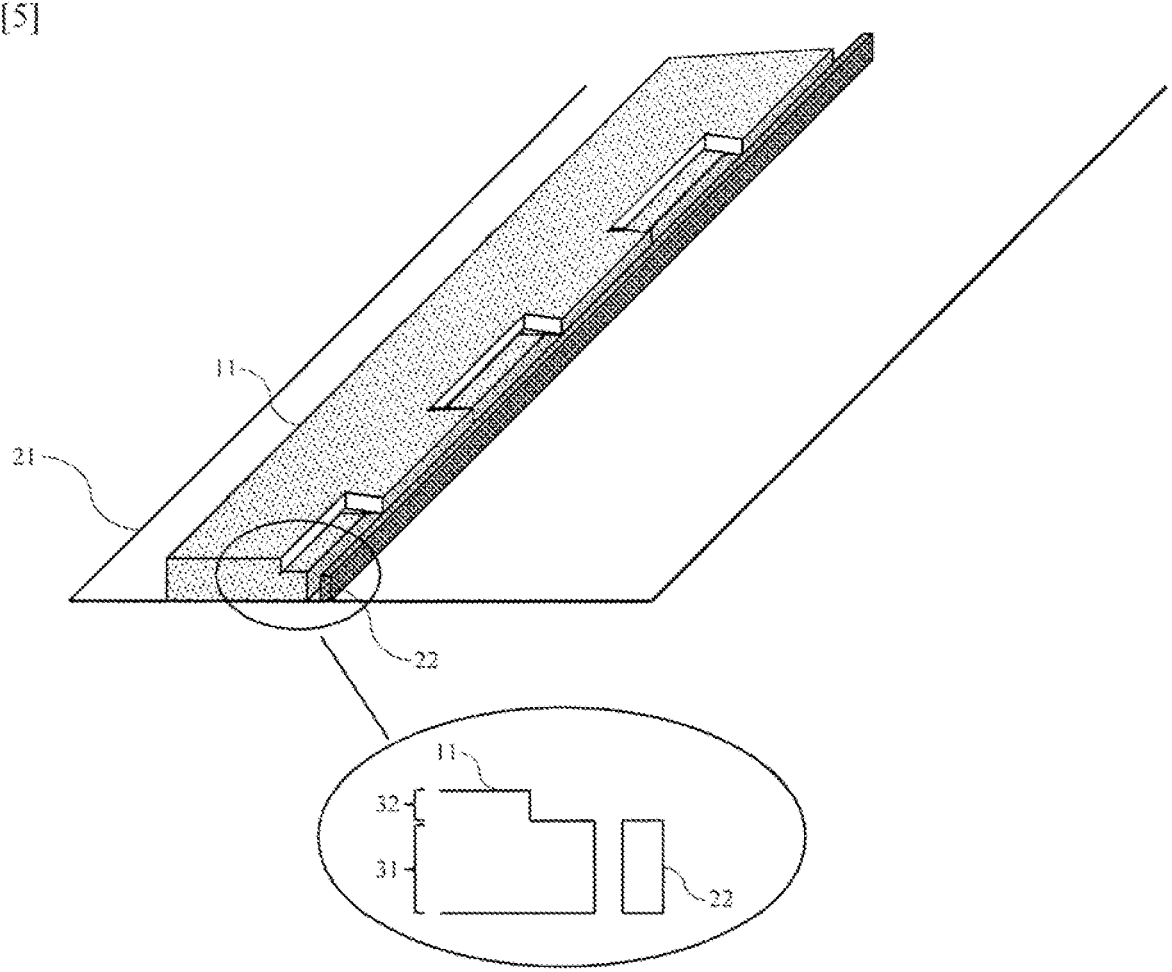
FIG. 5 illustrates a method of laying an optical cable.
Figure 6:
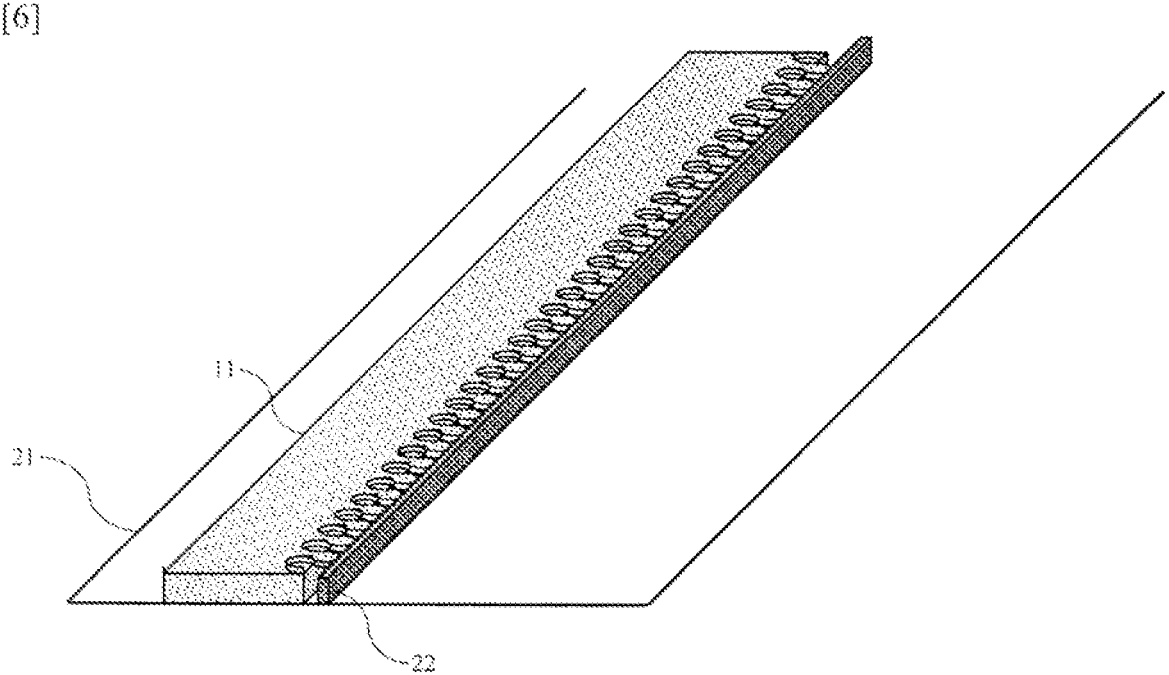
FIG. 6 illustrates a method of laying an optical cable.

The first example will be described below. FIGS. 5 and 6 illustrate a laying strip 11 having a concave-convex shaped side surface. The laying strips 11 and 12 each are composed of a base layer unit 31 that is close to the bottom surface and a surface layer unit 32 that is close to the top surface, and the surface layer unit 32 forms either a front side or a back side, with the base layer unit 31 forming the other. The base layer unit 31 has a side surface that is a plane. In this example, this plane is referred to as a contact side surface. The surface layer unit 32 has a concave-convex shaped side surface on the same side as the contact side surface, and the concave-convex shaped side surface has a concave portion and a convex portion whose shape is same as a shape plane-symmetrical to a shape of the concave portion with respect to the surface including the contact side surface. In this example, the concave-convex shaped side surface of the surface layer unit 32 is referred to as a concave-convex side surface.

The base layer unit 31 of each of the laying strip 11 and the laying strip 12 has a thickness such that an optical cable 22 is entirely sandwiched between the contact side surface of the laying strip 11 and the contact side surface of the laying strip 12. Furthermore, the laying strip 11 and the laying strip 12 desirably have the same thickness so that, with the laying strip 11 and the laying strip 12 laid, their surface layer units 32 are at the same height from a road surface 21.

To allow the concave portion in the concave-convex side surface of the laying strip 11 and the convex portion in the concave-convex side surface of the laying strip 12 to be engaged with each other in laying the laying strip 11 and the laying strip 12 with their concave-convex side surfaces facing each other, the concave portion of the laying strip 11 and the convex portion of the laying strip 12 desirably have the same shape. In addition, to allow the convex portion in the concave-convex side surface of the laying strip 11 and the concave portion in the concave-convex side surface of the laying strip 12 to be engaged with each other, the convex portion of the laying strip 11 and the concave portion of the laying strip 12 desirably have the same shape.

To allow the concave-convex side surface of the laying strip 11 and the concave-convex side surface of the laying strip 12 to be engaged with each other in laying the laying strips with respective concave-convex side surfaces facing each other, the concave portions and convex portions are arranged so that the concave portion of the laying strip 11 is located in front of the convex portion of the laying strip 12 and the convex portion of the laying strip 11 is located in front of the concave portion of the laying strip 12. For example, the laying strip 11 and the laying strip 12 are laid so that respective concave-convex side surfaces of the laying strip 11 and 12 are aligned at one longitudinal end and the concave-convex side surfaces face each other.

To allow the concave-convex side surface of the laying strip 11 and the concave-convex side surface of the laying strip 12 to be engaged with each other, the laying strip 11 and the laying strip 12 may have a concave-convex shape that starts with the concave portion at one end, ends with the convex potion at the other end, and has the concave and convex portions repeated between both ends. The convex portions and the concave portions included each in the laying strip 11 and the laying strip 12 may be formed to grow larger toward the ends to prevent the engaged portions from being separated on engaging the concave and convex portions with each other.

In this example, the optical cable 22 is sandwiched between the contact side surface of the laying strip 11 and the contact side surface of the laying strip 12 by the method of laying the optical cable of the first embodiment. According to the method of laying the optical cable of this example, the laying strip 11 is laid on the road surface 21 or a wall surface, the optical cable 22 is laid, the laying strip 12 is laid, the optical cable 22 is sandwiched, and then the concave-convex side surface of the laying strip 11 and the concave-convex side surface of the laying strip 12 may be engaged with each other. Alternatively, the laying strips 11 and 12 are laid, the optical cable 22 is laid, and then the concave-convex side surface of the laying strip 11 and the concave-convex side surface of the laying strip 12 may be engaged with each other. Furthermore, the optical cable 22 is laid, the laying strips 11 and 12 are laid on the road surface 21 or the wall surface one by one so that the optical cable 22 is sandwiched therebetween, and then the concave-convex side surface of the laying strip 11 and the concave-convex side surface of the laying strip 12 may be engaged with each other. When the optical cable 22 is laid and the laying strips 11 and 12 are simultaneously laid on the road surface 21 or the wall surface so that the optical cable 22 is sandwiched therebetween, the optical cable 22 is sandwiched and then the concave-convex side surface of the laying strip 11 and the concave-convex side surface of the laying strip 12 may be engaged with each other, or the concave-convex side surface of the laying strip 11 and the concave-convex side surface of the laying strip 12 are engaged with each other in advance and then the optical cable 22 may be sandwiched therebetween from the base layer unit 31 side. When the optical cable 22 is sandwiched between the laying strips 11 and 12 and they are laid together on the road surface 21 or the wall surface, the concave-convex side surface of the laying strip 11 and the concave-convex side surface of the laying strip 12 may be engaged with each other before or after they are laid.

Figure 7:
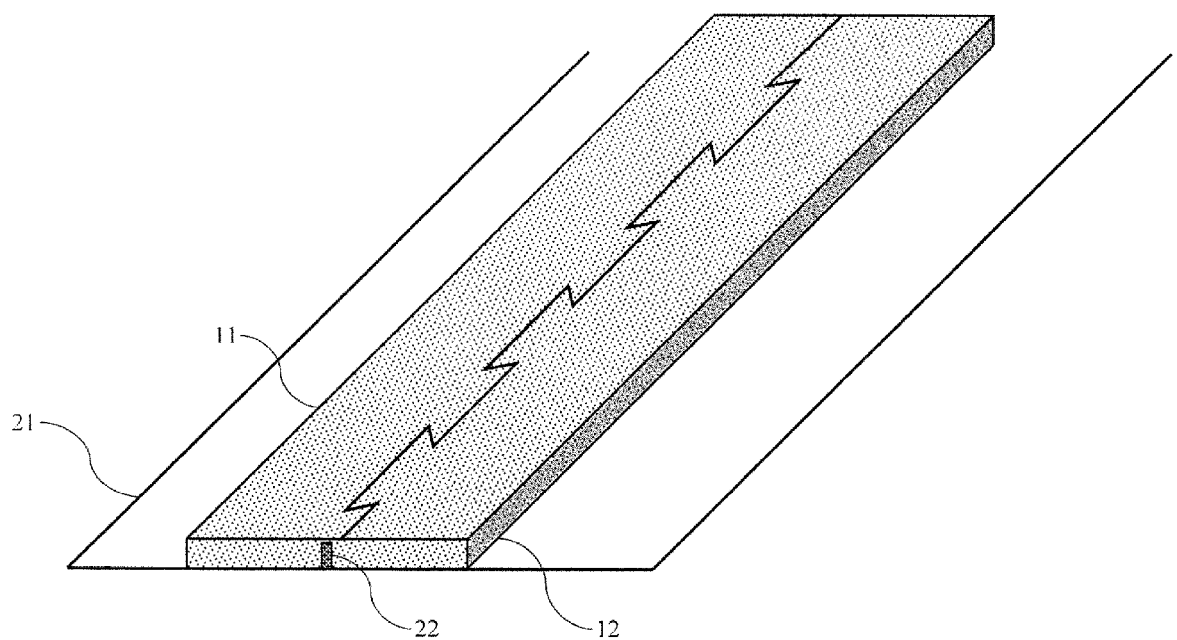
FIG. 7 illustrates the method of laying the optical cable.
Figure 8:
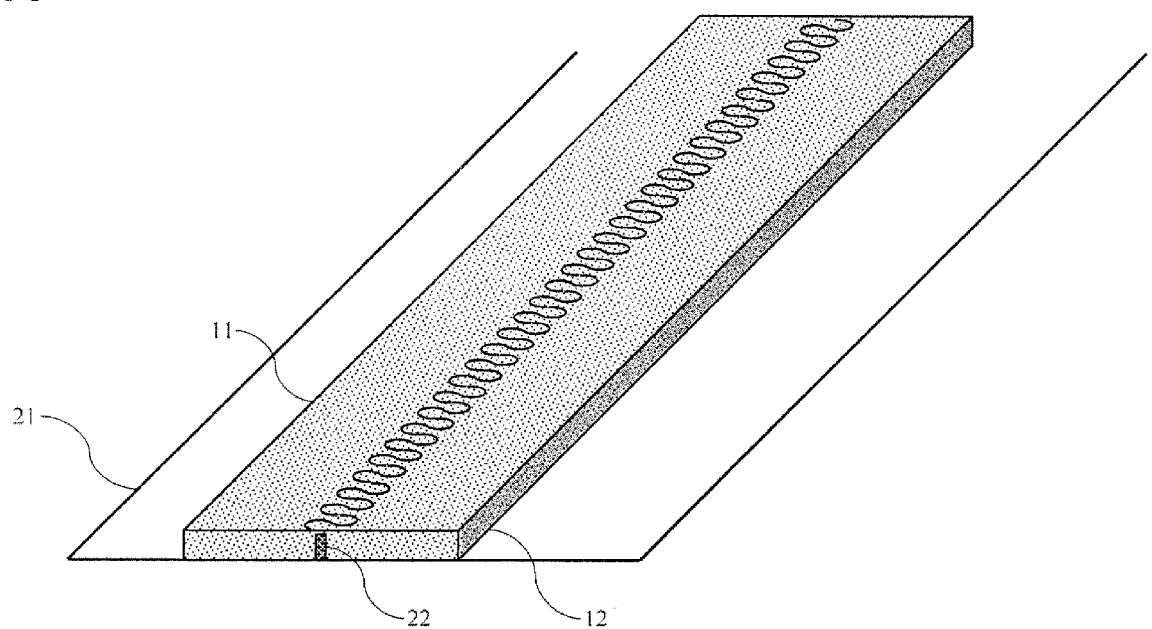
FIG. 8 illustrates the method of laying the optical cable.

As illustrated in FIGS. 7 and 8, engaging the concave-convex side surface of the laying strip 11 and the concave-convex side surface of the laying strip 12 with each other can prevent a distance between the contact side surface of the laying strip 11 and the contact side surface of the laying strip 12 from being enlarged.

Figure 9:
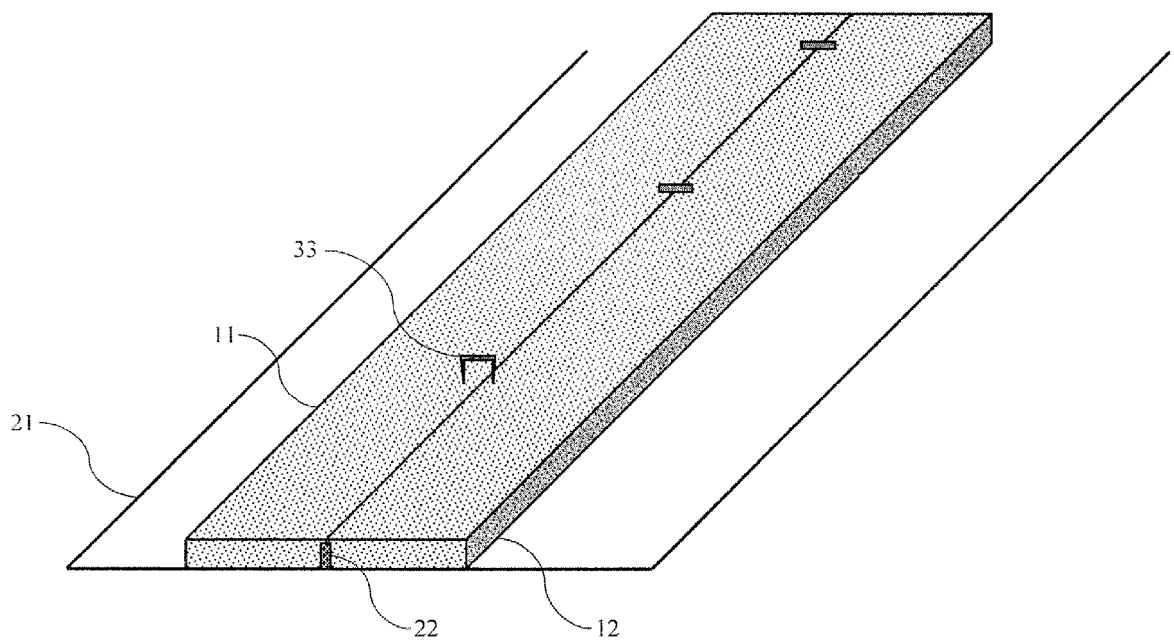
FIG. 9 illustrates the method of laying the optical cable.

As a second example, taking the preventive measure may be, with the side surfaces of the laying strips 11 and 12 between which the optical cable 22 is sandwiched facing each other, thrusting the tips of staples across the facing side surfaces of the laying strips 11 and 12. FIG. 9 illustrates a method of laying the optical cable in which the staples 33 are thrust in the top surfaces of the laying strip 11 and the laying strip 12 having the optical cable 22 sandwiched therebetween.

In this example, the optical cable 22 is sandwiched between the side surfaces of the laying strip 11 and laying strip 12 facing each other by the method of laying the optical cable of the first embodiment. According to the method of laying the optical cable of this example, the laying strip 11 is laid on the road surface 21 or the wall surface, the optical cable 22 is laid, the laying strip 12 is laid, the optical cable 22 is sandwiched, and then the staples 33 may be thrust in the top surfaces of the laying strip 11 and the laying strip 12 across the side surfaces facing each other. Alternatively, the laying strips 11 and 12 are laid, the optical cable 22 is laid, and then the staples 33 may be thrust in the top surfaces of the laying strip 11 and the laying strip 12 across the side surfaces facing each other. Furthermore, the optical cable 22 is laid, the laying strips 11 and 12 are laid on the road surface 21 or the wall surface one by one so that the optical cable 22 is sandwiched therebetween, and then the staples 33 may be thrust in the top surfaces of the laying strip 11 and the laying strip 12 across the side surfaces facing each other. When the optical cable 22 is laid and the laying strips 11 and 12 are simultaneously laid on the road surface 21 or the wall surface so that the optical cable 22 is sandwiched therebetween, the optical cable 22 is sandwiched and then the staples 33 may be thrust in the top surfaces of the laying strip 11 and the laying strip 12 across the side surfaces facing each other, or the staples 33 are thrust in the top surfaces of the laying strip 11 and the laying strip 12 across the side surfaces facing each other in advance and then the optical cable 22 may be sandwiched from the surfaces opposite to the surfaces having the staples 33 thrust therein. When the optical cable 22 is sandwiched between the laying strips 11 and 12 and they are laid together on the road surface 21 or the wall surface, the staples 33 may be thrust in the top surfaces of the laying strip 11 and the laying strip 12 across the side surfaces facing each other before or after they are laid.

Thrusting staples 33 in the laying strips 11 and 12 can prevent a distance between the side surface of the laying strip 11 and the side surface of the laying strip 12 facing each other from being enlarged. Using a tape or the like instead of the staple 33 can provide the similar effect.

According to the method of laying the optical cable of the present embodiment, it is possible to provide a method of laying an optical cable that is capable of laying and removing the optical cable in a stable place without civil engineering works.

Furthermore, taking the preventive measure to prevent a distance between the side surfaces of the laying strips 11 and 12 facing each other from being enlarged can prevent the optical cable 22 sandwiched between the laying strips 11 and 12 from being exposed.

According to the laying strip of the present embodiment, it is possible to provide a method of laying an optical cable that is capable of laying and removing the optical cable in a stable place without civil engineering works.

Furthermore, taking the preventive measure to prevent a distance between the side surfaces of the laying strips 11 and 12 facing each other from being enlarged can prevent the optical cable 22 sandwiched between the laying strips 11 and 12 from being exposed.

Third Embodiment

An example of a method of laying an optical cable according to the present disclosure will be described with reference to FIGS. 10 to 14. In FIGS. 10 to 14, the reference numerals 11 and 12 each denote a laying strip, the reference numeral 13 denotes a space, the reference numeral 14 denotes a tray, the reference numeral 15 denotes a lid, the reference numeral 16 denotes a cut, the reference numeral 21 denotes a road surface, the reference numeral 22 denotes an optical cable, the reference numeral 23 denotes an optical fiber core wire, and the reference numeral 24 denotes a connection unit.

Figure 10:
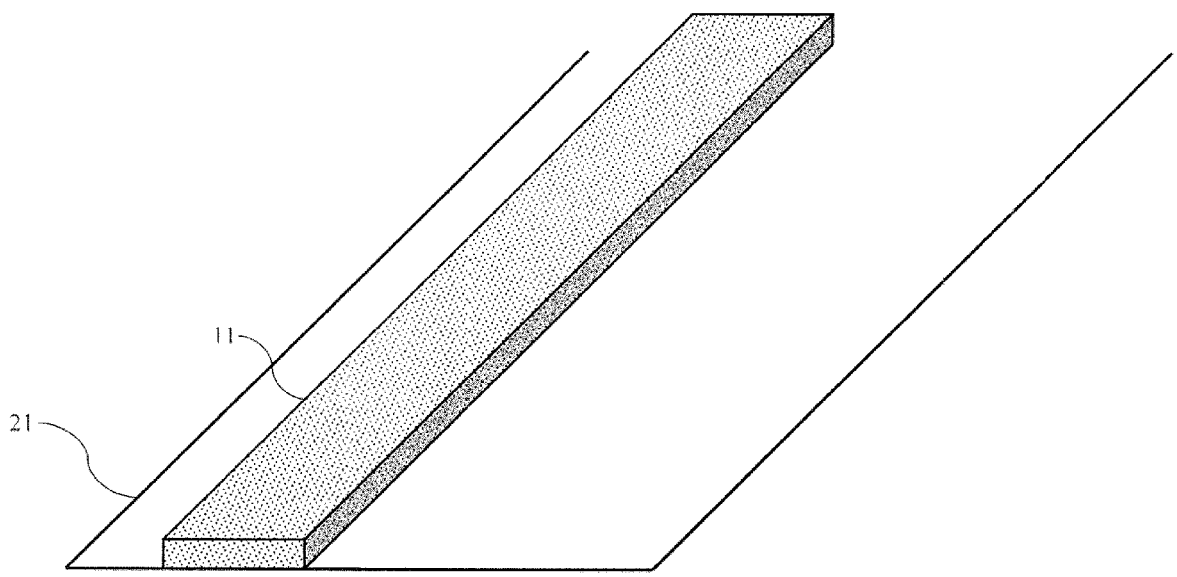
FIG. 10 illustrates a method of laying an optical cable.

FIG. 10 illustrates a laying strip 11 laid on a road surface 21. The configuration and the laying process of the laying strip 11 and a laying strip 12 described later are the same as those in the first embodiment or the second embodiment.

Figure 11:
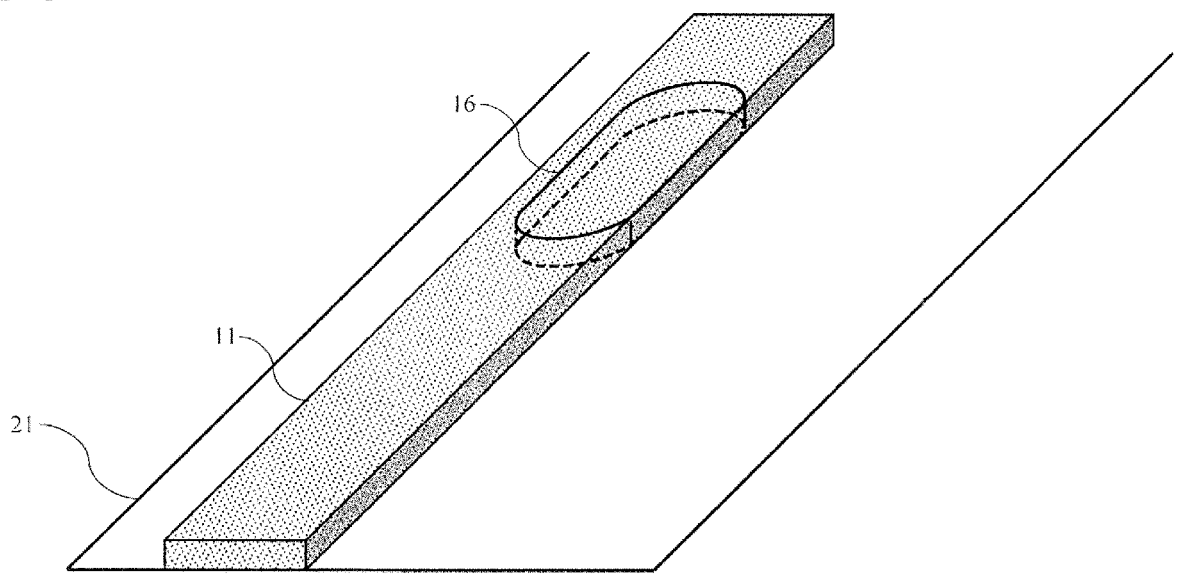
FIG. 11 illustrates the method of laying the optical cable.
Figure 12:
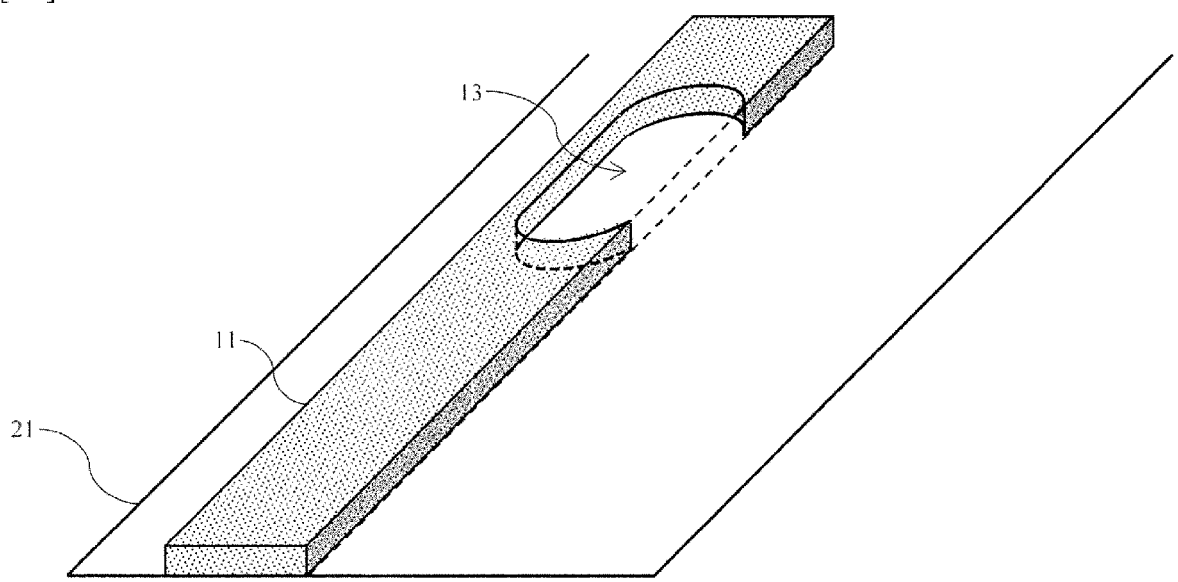
FIG. 12 illustrates the method of laying the optical cable.

FIGS. 11 and 12 illustrate the laying strip 11 in a process to form a space for accommodating a connection unit of an optical cable. As illustrated in FIG. 11, a cut 16 is made to cut out a part of the laying strip 11, and as illustrated in FIG. 12, the part is then cut out along the cut 16 to form the space 13 for accommodating the connection unit of the optical cable. The space 13 positioned to include a part of the side surface of the laying strip 11 allows the optical cable 22 and the space 13 for accommodating the connection unit to be located adjacent to each other with the optical cable 22 sandwiched between the side surface of the laying strip 11 and a side surface of another laying strip, which facilitates accommodating the connection unit of the optical cable. The space 13 formed in the center of the laying strip 11 causes the optical cable 22 and the space 13 for accommodating the connection unit to be spaced apart when the optical cable 22 is sandwiched between the laying strip 11 and another laying strip, which creates a need to form a path of the optical cable 22 to the space 13. For example, a cut line needs to be formed. When the space 13 is formed after the laying strip 11 is laid on the road surface 21 or a wall surface (not illustrated), the space 13 having a desired shape can be formed in a desired position depending on the environment in which the laying strip 11 is to be laid.

In the description for FIGS. 10 to 12, the space 13 is formed after the laying strip 11 is laid on the road surface 21 or the wall surface, but the laying strip 11 in which the space 13 is formed in advance may be laid on the road surface 21 or the wall surface. Forming the space 13 in advance at a site where a tool and an environment are prepared can facilitate forming the space 13.

Alternatively, the laying strip 11 may have a perforated line in advance to form the space 13 for accommodating the connection unit of the optical cable. In laying the laying strip 11, cutting the laying strip 11 using the perforated line to form the space 13 facilitates forming the space 13 in which the connection unit is to be installed.

A new space 13 may be additionally formed in the laying strip 11 having the space 13 formed therein. The additional formation of the new space 13 allows an optical cable to be additionally laid and a connection unit to be additionally accommodated.

Figure 13:
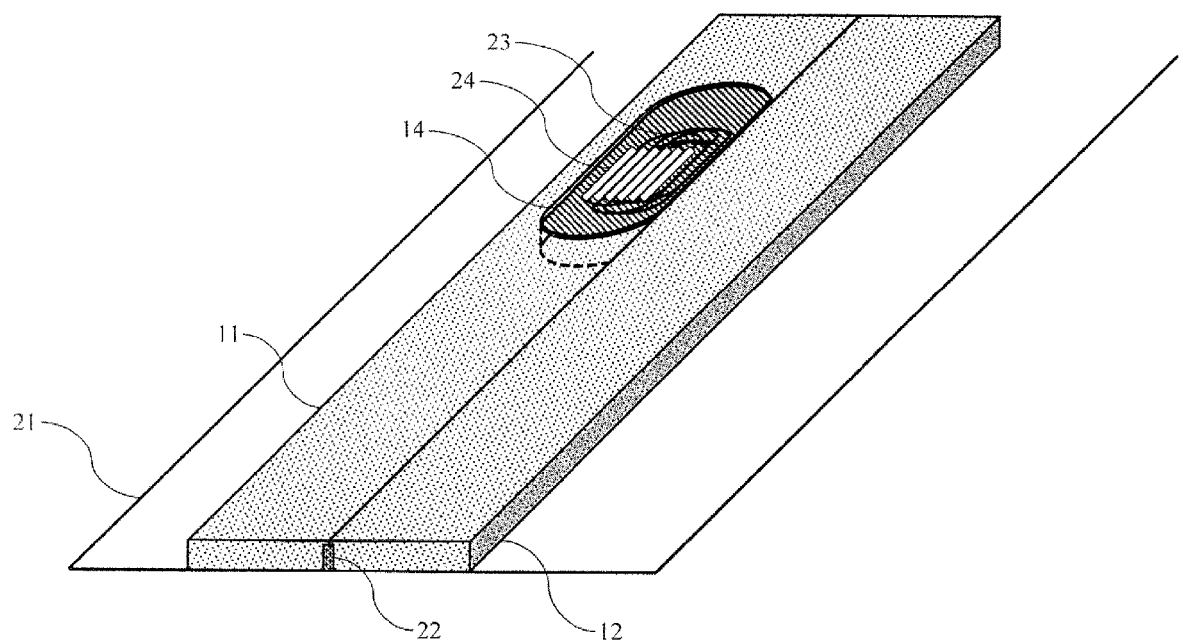
FIG. 13 illustrates the method of laying the optical cable.
Figure 14:
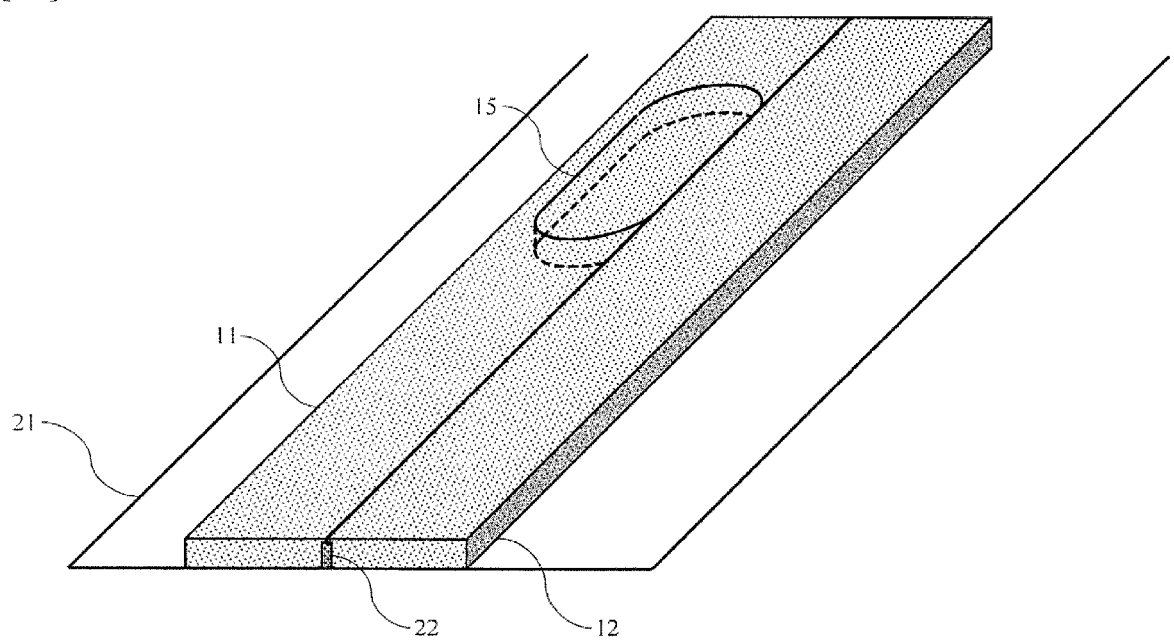
FIG. 14 illustrates the method of laying the optical cable.

FIGS. 13 to 14 illustrate a situation in which a connection unit is accommodated in the laying strip 11. As illustrated in FIG. 13, a tray 14, in which the connection unit is to be arranged, is provided at the bottom of the formed space 13. The tray 14 is desirably sized and shaped to be contained in the space 13. Before or after the tray 14 is installed, the optical cable 22 is sandwiched between the laying strip 11 and the laying strip 12.

As illustrated in FIG. 13, when the optical cable 22 is connected or branched, optical fiber core wires 23 are exposed at the end of the optical cable 22 and connected to form the connection unit 24. The extra-length portions of the optical fiber core wires 23 and the connection unit 24 are accommodated in the tray 14. With the tray 14 being provided, the extra-length portions of the optical fiber core wires 23 and the connection unit 24 can be protected. This eliminates the need to separately install a closure or ground box for accommodating the connection unit 24.

The space 13 may be formed after the optical cable 22 is sandwiched. When the laying strip 11 and the laying strip 12 are the same as those of the second embodiment, the space 13 may be formed after the preventive measure is taken. In this procedure, the connection unit 24 can be arranged in an appropriate position to adapt to the actual length of the optical cable 22, which eliminates the need to adjust the length of the optical cable 22. Accordingly, the waste of cutting the extra-length portion of the optical cable 22 is eliminated, and the trouble is also eliminated in which the optical cable 22 having an insufficient length is replaced with the optical cable 22 having a sufficient length.

As illustrated in FIG. 14, the open side of the space 13 is covered with a lid 15. Being covered with the lid 15, the connection unit 24 and the optical fiber core wire 23 can be protected. The material of the lid 15 is preferably similar to that of the laying strip 11. The shape of the lid 15 preferably fit to the open side of the space 13.

When the optical cable 22 is removed, the laying strip 11 and the laying strip 12 may be torn off from the road surface 21 or the wall surface (not illustrated). The laying strip 11 and the laying strip 12 may be torn off after the optical cable 22 is removed, or the laying strip 11 and the laying strip 12 may be torn off with the optical cable 22 sandwiched therebetween.

When the laying strip is laid on the road surface according to the above embodiment, components to be used such as a laying strip, an optical cable, and a tray, which are constituted of articles such that the laying strip is kept, for example, within about 1 cm in width and which have appropriate mechanical properties, can provide a design that does not cause failure due to being trampled or the like. As a result, wiring can be economically built which does not get in the way on the road surface and does not obstruct passage similarly to underground wiring or overhead wiring.

According to the method of laying the optical cable of the present embodiment, a method of laying an optical cable can be provided which is capable of laying and removing the optical cable in a stable place without civil engineering works.

INDUSTRIAL APPLICABILITY

The method of laying the optical cable according to the present disclosure can be applied to the information and communication industry.

REFERENCE SIGNS LIST 11, 12 laying strip
13 space
14 tray
15 lid
16 cut
21 road surface
22 optical cable
23 optical fiber core wire 24 connection unit
31 base layer unit
32 surface layer unit
33 staple

The invention claimed is:

1. A method of laying an optical cable, the method comprising
    laying the optical cable and two laying strips on a road surface or a wall surface so that the optical cable is sandwiched between side surfaces of the two laying strips; and
    taking a preventive measure to prevent a distance between the side surfaces of the two laying strips facing each other from being enlarged, wherein taking the preventive measure is, with the side surfaces of the two laying strips between which the optical cable is sandwiched facing each other, engaging respective concave-convex shaped portions, apart from portions in contact with the optical cable, included in the side surfaces of the two laying strips.

2. A method of laying an optical cable, the method comprising laying the optical cable and two laying strips on a road surface or a wall surface so that the optical cable is sandwiched between side surfaces of the two laying strips, wherein, in laying the laying strips,
    a part of the laying strips is cut out to form a space for accommodating a connection unit of the optical cable, and
    a tray, in which the connection unit is to be arranged, is provided at a bottom of the space, and
    wherein, in laying the optical cable,
    the optical cable is introduced into the tray and the connection unit is formed, and
    the connection unit is accommodated in the tray, and an open side of the space is then covered with a lid.

3. A method of laying an optical cable, the method comprising
    laying the optical cable and two laying strips on a road surface or a wall surface so that the optical cable is sandwiched between side surfaces of the two laying strips, wherein a space for accommodating a connection unit of the optical cable is formed in advance in the laying strips,
    wherein, in laying the laying strips,
    a tray, in which the connection unit is to be arranged, is provided at a bottom of the space, and
    wherein, in laying the optical cable,
    the optical cable is introduced into the tray and the connection unit is formed, and
    the connection unit is accommodated in the tray, and an open side of the space is then covered with a lid.

4. A method of laying an optical cable, the method comprising
    laying the optical cable and two laying strips on a road surface or a wall surface so that the optical cable is sandwiched between side surfaces of the two laying strips, wherein the laying strips have a perforated line to form a space for accommodating a connection unit of the optical cable,
    wherein, in laying the laying strips,
    the laying strips are cut using the perforated line to form the space, in which the connection unit is to be installed, and a tray, in which the connection unit is to be arranged, is then provided at a bottom of the space, and
    wherein, in laying the optical cable,
    the optical cable is introduced into the tray and the connection unit is formed, and
    the connection unit is accommodated in the tray, and an open side of the space is then covered with a lid.

* * * * *